UNITED STATES PATENT OFFICE.

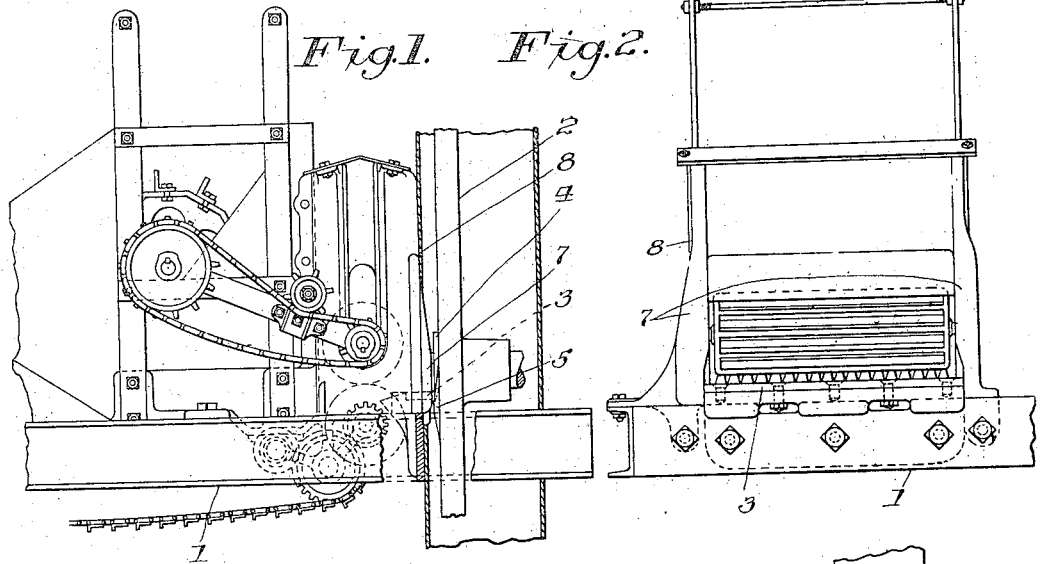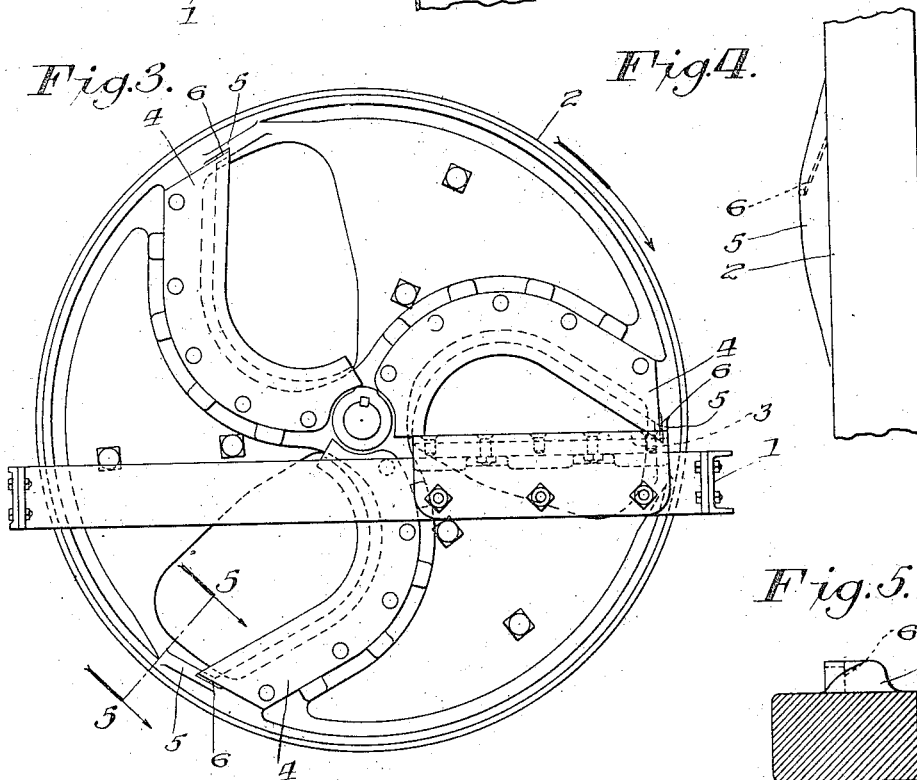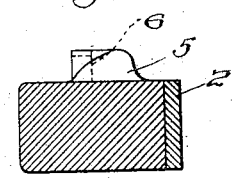

GEORGE M. MERWIN, OF BERWYN, ILLINOIS, ASSIGNOR TO INTERNATIONAL HARVESTER COMPANY OF NEW JERSEY, A CORPORATION OF NEW JERSEY.

ENSILAGE-CUTTER.

1,241,541. Specification of Letters Patent. Patented Oct. 2, 1917.

Application filed July 6, 1915. Serial No. 38,300.

*To all whom it may concern:*

Be it known that I, GEORGE M. MERWIN, a citizen of the United States, residing at Berwyn, in the county of Cook and State of Illinois, have invented certain new and useful Improvements in Ensilage-Cutters, of which the following is a full, clear, and exact specification.

My invention relates to ensilage cutters. It has for its object to improve the construction of ensilage cutters in such a manner that even in the event of improper adjustment, wear or irregularity in manufacture, the knives on the rotating cutter head may not strike the cutter bar and thereby cause breakage of the parts or wreckage of the machine. I attain this object by an improved construction wherein coöperating protecting or buffing means are formed on the rotary cutter head and on a stationary part adjacent the cutter bar to prevent the knives from being brought into striking contact or dangerous proximity to the cutter bar.

In the accompanying drawings I have for purposes of illustration, shown one embodiment which my invention may assume in practice.

In these drawings:

Figure 1 is a side elevation of a portion of an ensilage cutter equipped with my improvement.

Fig. 2 is an end view of the cutter bar and the protecting means therefor, the cutter head being removed.

Fig. 3 is a side elevation of a cutter head.

Fig. 4 is a detail view showing the protecting means on the cutter head.

Fig. 5 is a partial sectional view taken on line 5—5 of Fig. 3, showing the protecting means on the cutter head.

In these drawings I have shown an ensilage cutter 1 having a rotating cutter head 2 and a cutter bar 3, illustrating for convenience the ensilage cutter described in my copending application, Serial No. 771,625, filed June 4, 1913, wherein the cutter head 2 carries knives 4 of concave shape.

In my improvement I provide a lug 5 near the periphery of the cutter head and adjacent the outer end of each knife. This lug is sloped or inclined upward toward the knife on both its sides and preferably extends slightly closer to the edge of the cutter bar than the knife edge, as shown in Fig. 1, the knife preferably having its tip seated in a beveled recess 6 in the lug. Coöperating with this protecting lug 5 is a downwardly inclined extension 7 formed on any suitable part of the frame 1 adjacent the cutter bar, as, for instance, the feed roller casting 8. This extension 7 also projects outward, as shown in Fig. 1, to a point slightly closer to the path of the knives 4 than the cutter bar 3.

In the operation of my improved construction, when the cutter head 2 is rotated, obviously, the knives 4 cannot be brought into deleterious contact with the cutter bar 3 because of the combined action of the lugs 5 and the extension 7, these lugs 5, when the knives are too close to the cutter bar, striking the extension 7 before the knives can strike the cutter bar, and thereby insuring proper clearance between the former and the latter until the operator, detecting wear upon the surfaces 5 and 7, makes the necessary adjustment of the cutter head.

While I have in this application described a specific form which my invention may assume in practice, it is, of course, to be understood that this form is used for purposes of illustration and that the invention may be modified without departing from its spirit.

What I claim is:

1. In an ensilage cutter, a frame, a cutter bar thereon, a cutter head thereon, a knife on said cutter head, and supplemental means located between said cutter head and bar for preventing conflict between said knife and cutter bar.

2. In an ensilage cutter, a frame, a cutter bar thereon, a cutter head thereon, a knife on said cutter head, a lug on said cutter head extending slightly beyond the plane of said knife, and means on said frame engageable with said lug to prevent conflict between said knife and cutter bar.

3. In an ensilage cutter, a knife, and a cutter head carrying the same and having a lug adjacent its periphery sloping toward the edge of the knife and extending slightly beyond the plane of the knife edge, said lug having a grooved portion forming a support for the tip of the knife.

4. In an ensilage cutter, a frame, a cutter bar thereon, a coöperating cutting member including a knife associated therewith, and means separate from said knife having a camming action between the cutter bar and cutting member for preventing conflict between said knife and cutter bar.

Chicago, Ill., June 23, 1915.

In testimony whereof I affix my signature.

GEORGE M. MERWIN.